United States Patent
Nagahara (10) Patent No.: US 12,438,771 B2
(45) Date of Patent: *Oct. 7, 2025

(54) INFORMATION PROCESSING APPARATUS, CONTROL METHOD OF THE SAME, AND NON-TRANSITORY COMPUTER-READABLE STORAGE MEDIUM

(71) Applicant: CANON KABUSHIKI KAISHA, Tokyo (JP)

(72) Inventor: Ryuji Nagahara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,961

(22) Filed: Sep. 1, 2023

(65) Prior Publication Data
US 2023/0421438 A1    Dec. 28, 2023

Related U.S. Application Data (63) Continuation of application No. 17/356,846, filed on Jun. 24, 2021, now Pat. No. 11,929,874.

(30) Foreign Application Priority Data

Jul. 6, 2020 (JP) ................................ 2020-116645

(51) Int. Cl.
H04L 41/0816 (2022.01)
H04W 24/02 (2009.01)
H04W 84/12 (2009.01)

(52) U.S. Cl.
CPC ......... *H04L 41/0816* (2013.01); *H04W 24/02* (2013.01); *H04W 84/12* (2013.01)

(58) Field of Classification Search
CPC .................................................. H04L 41/0816
(Continued)

(56) References Cited

U.S. PATENT DOCUMENTS 10,379,787 B2    8/2019   Yanagawa
2003/0142631 A1*  7/2003  Silvester ............... H04W 88/06
                                                            370/386
(Continued)

FOREIGN PATENT DOCUMENTS

JP    2012085136 A    4/2012
JP    2012090026 A    5/2012
(Continued)

OTHER PUBLICATIONS

Notice of Allowance issued in U.S. Appl. No. 17/356,846, mailed Dec. 15, 2023.
(Continued)

*Primary Examiner* — Wing F Chan
*Assistant Examiner* — John Fan
(74) *Attorney, Agent, or Firm* — ROSSI, KIMMS & McDOWELL LLP (57) ABSTRACT

An information processing apparatus is provided, the apparatus comprises a first communication interface for performing wireless communication via a network provided by an external access point; a second communication interface for performing wired communication; a unit for setting, in a case where a user operation to set a first communication function for connecting to the external access point via the first communication interface to perform wireless communication has been accepted, a setting indicating that a second communication function for performing wired communication will not be used, and unit for setting, in case where a user operation to cancel the setting of the first communication function has been accepted before the information
(Continued)

processing apparatus belongs to the network provided by the external access point, a setting indicating that the second communication function will be used.

11 Claims, 7 Drawing Sheets

(58) Field of Classification Search
USPC .......................................................... 709/220
See application file for complete search history.

(56) References Cited

U.S. PATENT DOCUMENTS

| | | | |
|---|---|---|---|
| 2004/0114601 A1* | 6/2004 | Watanabe | H04L 67/303 370/395.2 |
| 2006/0067360 A1* | 3/2006 | Ohara | H04L 69/18 370/465 |
| 2006/0075124 A1 | 4/2006 | Dougherty et al. | |
| 2010/0211777 A1 | 8/2010 | Ishihara et al. | |
| 2012/0117616 A1 | 5/2012 | Kirkup et al. | |
| 2012/0196639 A1 | 8/2012 | Takeda | |
| 2013/0178234 A1* | 7/2013 | Jones | H04W 4/48 455/456.4 |
| 2016/0205076 A1 | 7/2016 | Shimizu | |
| 2018/0042056 A1 | 2/2018 | Hosoda | |
| 2018/0234840 A1* | 8/2018 | Nakamura | H04W 48/16 |
| 2018/0332586 A1 | 11/2018 | Takeuchi | |
| 2018/0332634 A1* | 11/2018 | Kawaura | G06F 3/1238 |
| 2019/0114128 A1* | 4/2019 | Nagahara | G06F 3/1204 |
| 2019/0228192 A1* | 7/2019 | Morimoto | H04W 36/0027 |
| 2019/0265922 A1* | 8/2019 | Ikeda | G06F 3/1203 |

FOREIGN PATENT DOCUMENTS

| | | | | |
|---|---|---|---|---|
| JP | 2012142681 A | | 7/2012 | |
| JP | 2013046290 A | * | 3/2013 | ......... H04L 41/0816 |
| JP | 2016131333 A | | 7/2016 | |
| JP | 2018007071 A | | 1/2018 | |
| JP | 2018022408 A | | 2/2018 | |
| JP | 2018030295 A | | 3/2018 | |
| WO | 2009011055 A1 | | 1/2009 | |
| WO | WO-2009058533 A2 | * | 5/2009 | ............ H04W 76/04 |

OTHER PUBLICATIONS

Office Action issued in U.S. Appl. No. 17/356,846, mailed May 13, 2022.

Office Action issued in U.S. Appl. No. 17/356,846, mailed Nov. 14, 2022.

Office Action issued in U.S. Appl. No. 17/356,846, mailed Jun. 23, 2023.

* cited by examiner

| SETTING ITEM | SETTING VALUE |
|---|---|
| WIRED LAN | ENABLED |
| WIRED LAN IP ADDRESS | XXX.XXX.XXX.XXX |
| WIRED LAN SUBNET MASK | YYY.YYY.YYY.YYY |
| COMMUNICATION METHOD | FULL DUPLEX |
| COMMUNICATION RATE | 1000BASE-T |
| ... | ... |
| WIRELESS LAN | ENABLED |
| WIRELESS LAN IP ADDRESS | XXX.XXX.XXX.XXX |
| WIRELESS LAN SUBNET MASK | YYY.YYY.YYY.YYY |
| ACCESS POINT | XXXXXXX |
| NETWORK KEY | YYYYYYY |

INFORMATION PROCESSING APPARATUS, CONTROL METHOD OF THE SAME, AND NON-TRANSITORY COMPUTER-READABLE STORAGE MEDIUM

BACKGROUND OF THE INVENTION

Field of the Invention

The present invention relates to an information processing apparatus, a control method of the same, and a non-transitory computer-readable storage medium.

Description of the Related Art

In recent years, a user needs to be able to execute wired LAN (Local Area Network) communication or wireless LAN communication as needed. In addition, an information processing apparatus (to be referred to as an MFP hereinafter) such as a multi-function peripheral, a printer, or the like that includes communication interfaces for both a wired LAN and a wireless LAN is popular.

Normally, an apparatus that supports a plurality of communication interfaces includes a means for the user to enable/disable each communication interface. In general, if both communication interfaces (the wired LAN and the wireless LAN) have been enabled, the wired LAN is given preference from the point of view of the communication rate and the stability of communication.

On the other hand, a method (wireless setup wizard) that causes a user to sequentially set necessary settings to establish a connection between the MFP and an access point (to be referred to as an AP hereinafter) when the wireless LAN is to be used is popular. In the wireless setup wizard, for example, necessary setting items related to an AP search, displaying an SSID (Service Set Identifier) of a discovered AP, the network key of the AP, and the like can be set.

In addition, a technique for preventing communication from being disrupted while the communication is being switched from the wired LAN to the wireless LAN in an apparatus that is performing communication by the wired LAN has been proposed (Japanese Patent Laid-Open No. 2012-90026). In Japanese Patent Laid-Open No. 2012-90026, the wired LAN settings are stored before an attempt is made to establish communication by the wired LAN, and the communication will be reconnected via the wired LAN based on the stored settings if the switching operation to the wireless LAN has failed.

SUMMARY OF THE INVENTION

In the present invention, connection by a wired LAN is maintained even in a case in which a user has suspended the wireless setup wizard executed in a state in which the wired LAN has been enabled.

The present invention includes the following arrangement. According to an aspect of the present invention, provided is an information processing apparatus, comprising: a first communication interface configured to perform wireless communication via a network provided by an external access point; and a second communication interface configured to perform wired communication; at least one memory that stores a set of instructions; and at least one processor that executes the instructions, the instructions, when executed, causing the information processing apparatus to perform operations comprising setting, in a case in which a user operation to set a first communication function for connecting to the external access point via the first communication interface to perform wireless communication via the external access point has been accepted, a setting indicating that a second communication function for performing wired communication via the second communication interface will not be used, and setting, in case in which a user operation to cancel the setting of the first communication function has been accepted before the information processing apparatus belongs to the network provided by the external access point via the first communication interface, a setting indicating that the second communication function will be used.

According to the present invention, connection by a wired LAN can be maintained even in a case in which the user has suspended the wireless setup wizard executed in a state in which the wired LAN has been enabled.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In this embodiment, a mechanism for notifying a user that a wired LAN has been disabled is provided in a case in which the wired LAN has been disabled when the user has executed an SSID search operation in a wireless setup wizard to connect to an AP.

In addition, in this embodiment, there is provided, in a case in which connection to the AP has failed upon executing the wireless setup wizard, a mechanism for re-enabling the wired LAN to reconnect to the wired LAN. Furthermore, there is also provided, in a case in which the user has suspended the wireless setup wizard processing in the middle of the processing, the mechanism for re-enabling the wired LAN to reconnect to the wired LAN. This mechanism will prevent, in a case in which the user has suspended the wireless setup wizard processing in the middle of the processing in the stage after the wired LAN has been disabled, a transition to a state in which the wired LAN is left disabled but the wireless LAN connection has also not been completed, that is, a state in which an information processing apparatus is not connected to either communication network. A more specific description of the mechanism will be given hereinafter.

Note that short-range wireless communication according to this embodiment is executed in compliance with a wireless LAN standard (IEEE802.11). That is, the short-range wireless communication described in this embodiment can also be referred to as a wireless LAN (wireless Local Area Network).

Arrangement of Communication System

Figure 1:
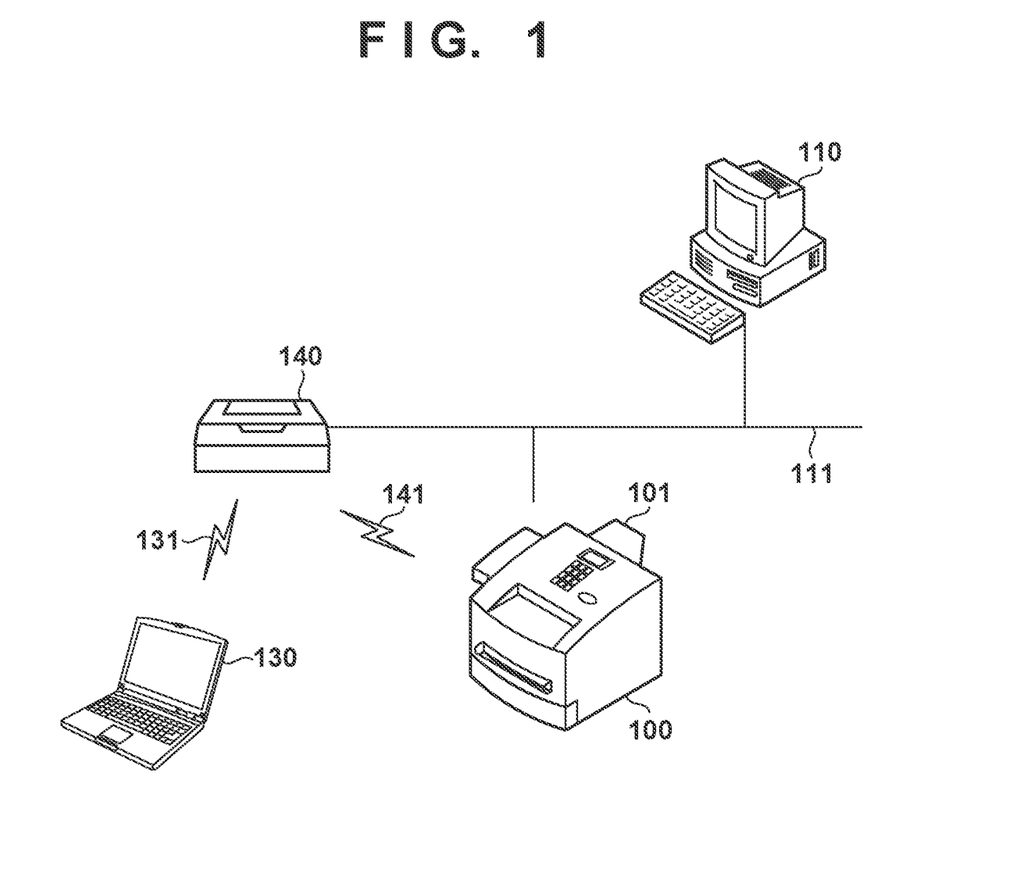
FIG. 1 is a view showing the arrangement of a network.

The arrangement of a communication system according to an embodiment of the present invention will be described with reference to FIG. 1. The communication system is formed by a multi-function peripheral (MFP) 100 and a client PC 110. The MFP 100 includes an operation unit 101 and can display network connection information such as an IP address or the like, a print job history, and the like of the MFP 100 on the operation unit 101. The operation unit 101 also serves as a user interface for a wireless setup wizard which sets the settings for starting a wireless LAN connection. Note that the MFP 100 may also be referred to as a printing apparatus that has functions related to image formation such as an image formation function, a print data reception function, and the like. The MFP 100 may also be referred to as an information processing apparatus since it has an information processing function.

The MFP 100 and the client PC 110 are connected to each other via a wired LAN (wired Local Area Network) 111. The wired LAN is, for example, the Ethernet® and may simply be referred to as a LAN. The client PC 110 transmits a print job to the MFP 100 via the wired LAN 111. The MFP 100 is also connected to a client PC 130 via a wireless LAN access point (AP) 140. The client PC 130 transmits a print job to the MFP 100 via short-range wireless connections 131 and 141 serving as the wireless LAN.

Hardware of MFP

Figure 2:
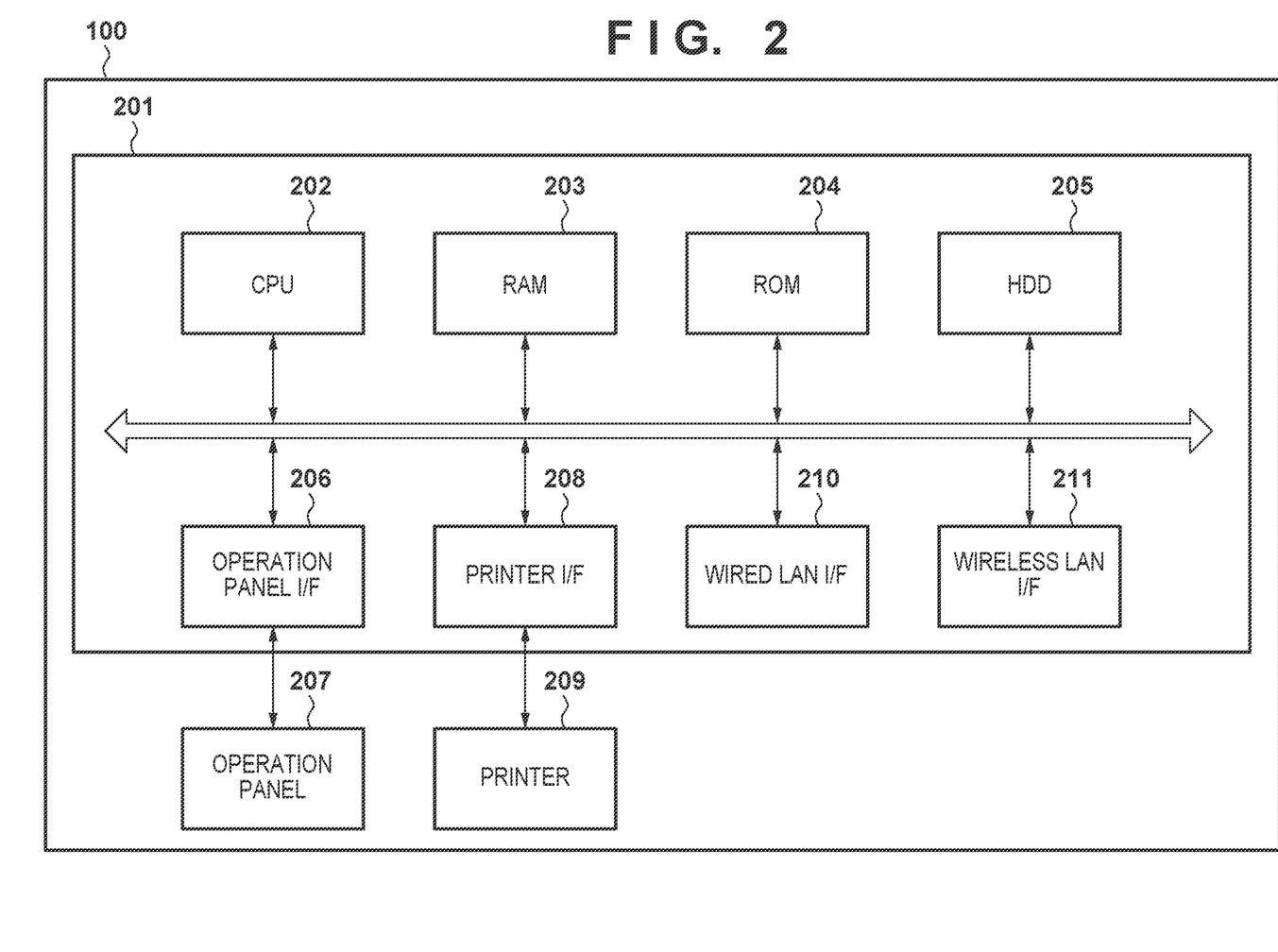
FIG. 2 is a block diagram of the hardware arrangement of an MFP.

FIG. 2 is block diagram showing an example of the hardware arrangement of the MFP 100.

A CPU 201 including a control unit 202 controls the operation of the entire MFP 100. The CPU 202 reads out a control program stored in a ROM 204 and executes the program to perform various kinds of control operations such as communication control and the like. A RAM 203 is used as a main memory of the CPU 202 and as a temporary area such as a work area or the like. An HDD 205 stores data and various kinds of programs or various kinds of information tables. An operation panel I/F 206 connects an operation panel 207 to the control unit 201 and executes display control together with the control unit 201. Note that I/F is an abbreviation of "interface".

The operation panel 207 includes, for example, a touch panel, and is used to provide a user interface. The operation panel 207 may further include mechanical buttons and a display unit such as an LED or the like.

A printer I/F 208 connects a printer 209 (printer engine) to the control unit 201. The printer 209 executes, based on print data input via the printer I/F 208, print processing on a sheet fed from a sheet feeding cassette (not shown).

An ethernet cable shaped like a connecter such as RJ-45 or the like is connected to a wired LAN I/F 210, and the wired LAN I/F 210 can execute communication with an external apparatus. A wireless LAN I/F 211 is an I/F for executing wireless communication, and can execute communication with an external apparatus via an AP. Note that the wireless LAN I/F 211 can also execute direct wireless communication with an external apparatus without intervention of an AP. In this case, the MFP 100 causes the wireless LAN I/F 211 to function as a software access point. The external apparatus can connect to the software access point to perform direct wireless communication with the MFP 100. Whether the direct wireless communication function is to be enabled or disabled can be switched based on a user operation.

Note that although the MFP 100 is arranged so that one CPU 202 will use one memory (RAM 203) to execute each processing operation shown in a flowchart to be described later, it may have another arrangement. For example, it may be arranged so that a plurality of CPUs and a plurality of memories will work in cooperation to execute each processing operation. In addition, the MFP 100 may also include a scanner for reading an image.

Software of MFP

Figure 3:
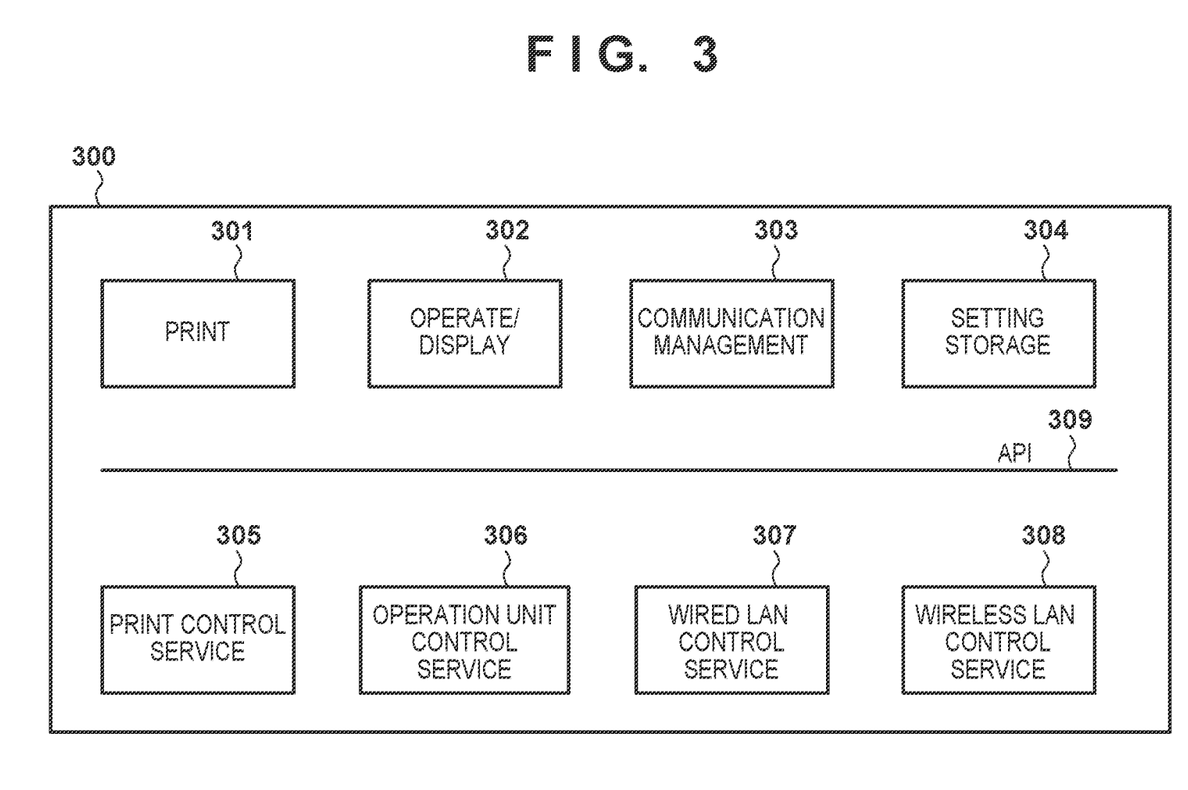
FIG. 3 is a block diagram of the software arrangement of the MFP.

FIG. 3 is a block diagram showing the software arrangement of the MFP 100 according to this embodiment. The MFP 100 includes, as application programs which are to operate on a platform, a print program 300, an operation/display program 302, a communication management program 303, and a setting storage program 304. The above-described application programs can be activated by using an application program interface (API) 309 to communicate with various kinds of control services. Note that the term "program" may be omitted in the following description.

A print control service 305, an operation unit control service 306, a wired LAN control service 307, and a wireless LAN control service 308 are modules referred to as control services as a whole. Each control service has a function for providing a user interface, which can be operated by a user, in cooperation with the applications such as a printing application 301, the communication management 303, the operation/display 302, and the setting storage 304.

The communication management 303 controls, based on the MPF setting information stored in the setting storage 304, processing to determine which communication interface is to be used to perform communication and the like. For example, consider a case in which the user has started, in a state in which communication is being performed by using the wired LAN I/F 210, the wireless setup wizard to instruct the communication operation to be switched to communication using the wireless LAN I/F 211. In such a case, the communication management 303 will transmit a service stop instruction to the wired LAN control service 307 and transmit a service start instruction to the wireless LAN control service 308.

Furthermore, if communication cannot be established when the communication interface switching was attempted, the communication management 303 may instruct the communication interface that was executing communication before the communication interface switching occurred to execute a reconnection operation based on the MFP setting information stored in the setting storage 304. The communication interface switching includes, for example, an operation to switch from the wired LAN I/F 210 to the wireless LAN I/F 211 or an operation to switch from the wireless LAN I/F 211 to the wired LAN I/F 210.

In particular, in a case in which the communication interface is to be switched from the wired LAN I/F 210 to the wireless LAN I/F 211, there may be a case in which a wireless communication apparatus such as an AP which is to be a communication partner in the wireless LAN cannot be detected. In addition, the user may suspend the processing of the wireless setup wizard in the middle of the processing. In such a case, the communication management 303 will execute control to switch (that is, to return) the communication operation to communication by the wired LAN again to prevent a communication disrupted state.

In addition, the communication management 303 cooperates with the operation unit control service 306 and the wireless LAN control service 308 to provide the wireless setup wizard.

In a case in which the user has started the wireless setup wizard on the operation panel 207, the wireless LAN control service 308 will execute scanning to detect an AP present within the range of reach of the wireless signal of the wireless LAN I/F 211. During an active scan operation, a communicable AP will be detected by broadcasting a probe request frame periodically or at a timing instructed by the user, and receiving a probe response frame returned as a response. If a probe response frame is not received, it will be determined that a communicable AP could not be detected. During a passive scan operation, a communicable AP will be detected by receiving a beacon frame. If a beacon frame is not received, it will be determined that a communicable AP could not be detected.

The wireless LAN control service 308 executes processing for selecting an AP which is to serve as a communication partner among a plurality of detected APs. A communication partner candidate list including the detected APs that may serve as a communication partner will be generated, and the generated list will be displayed on the operation panel 207. When the user performs a selection operation and selects an AP from the communication partner candidate list displayed on the operation panel, the wireless LAN control service 308 will start a connection operation to the selected AP. If necessary setting values are already set in the setting items for the wireless LAN at this time, the communication may be started based on these setting values. However, the setting values may also be newly set via the wireless setup wizard.

Wireless Setup Wizard

Figure 4:
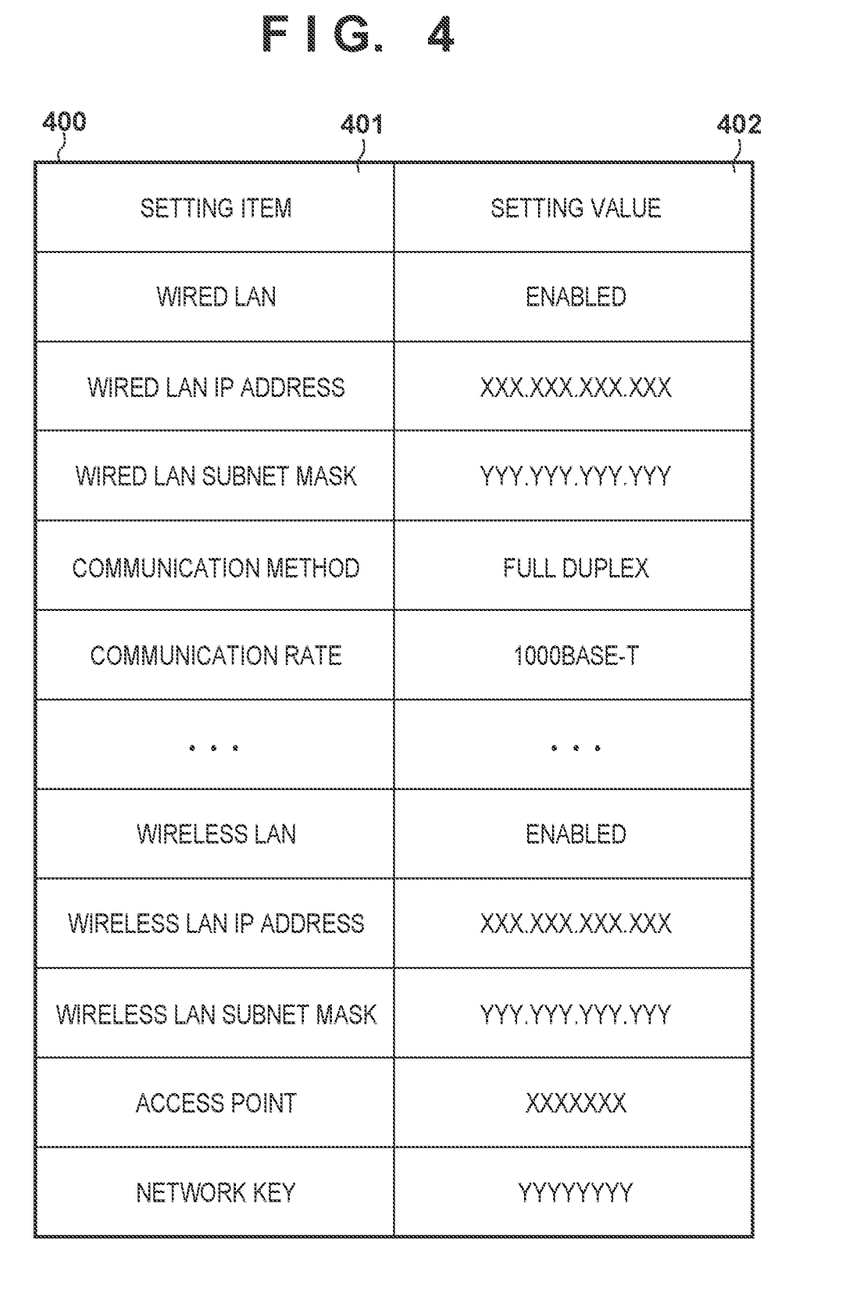
FIG. 4 is a table showing an example of setting items/setting values managed by the MFP.

FIG. 4 is a table showing an example of setting items of communication interfaces held by the MFP 100 which are managed in the HDD 205 by the MFP 100.

In a setting item list 400, setting items 401 and setting values 402 are linked and managed together. Depending on the setting item, the user can use the operation panel 207 to change the setting value.

A setting to enable/disable the wired LAN communication, an IP address to be used in the communication using the wired LAN I/F 210, a subnet mask, a communication method (full duplex/half duplex) of the wired LAN communication, and the like are held as the setting items related to the communication using the wired LAN I/F 210.

A setting to enable/disable the wireless LAN communication is included as a setting item related to communication using the wireless LAN I/F 211. In addition, an IP address to be used in the communication using the wireless LAN I/F 211, a subnet mask, an SSID of an AP to be connected, a network key associated with the SSID, and the like are stored as the setting items. Additionally, an encryption method, a wireless band to be used, a channel designation, an output rate (designation of a maximum output ratio), and the like may also be held as the setting items.

Figure 5:
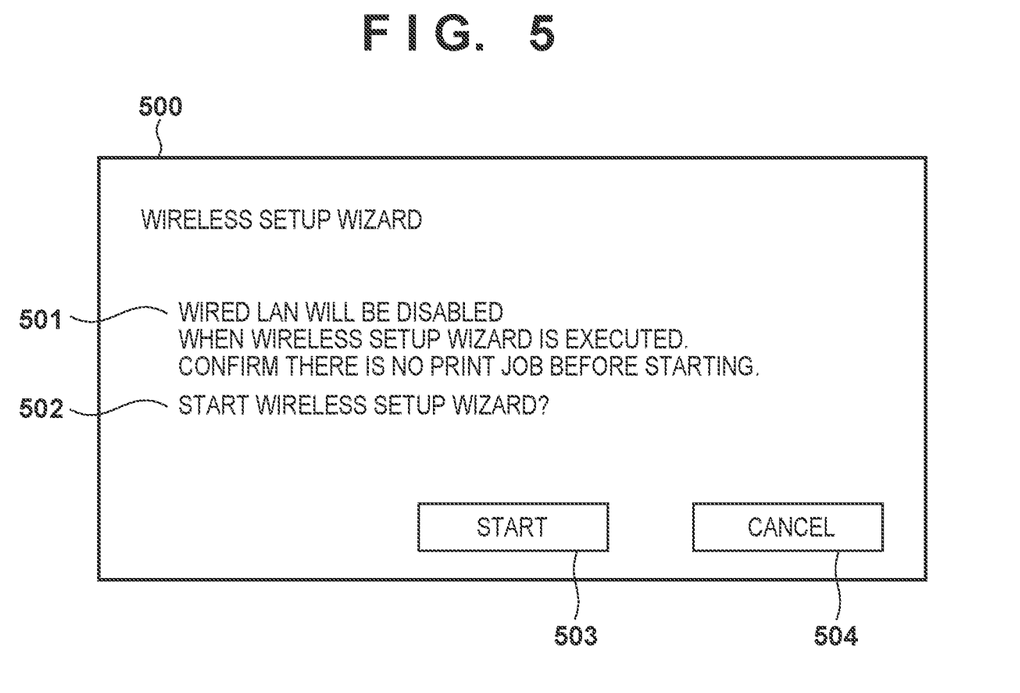
FIG. 5 is a view showing an example of a message to be displayed on a user interface of the MFP.

FIG. 5 is an example of a wireless setup wizard screen that is displayed on the operation panel 207 of the MFP 100.

A wireless setup wizard start confirmation screen 500 is displayed when the user has operated the operation panel 207 and instructed the start of the wireless setup wizard.

In a wireless LAN state description message 501, a message describing that the wired LAN I/F 210 will be disabled when the execution of the wireless setup wizard is started is displayed. This message can also be understood to be a warning that the wired LAN I/F 210 will be disabled.

In a wireless setup wizard start confirmation message 502, a message asking the user to confirm whether the wireless setup wizard processing is to be started is displayed. When the user presses (or touches) a start button 503, the MFP 100 will start a scanning operation for an AP that is present within the range of reach of the wireless signal of the wireless LAN I/F 211. When a cancel button 504 is pressed, the MFP 100 will immediately end the wireless setup wizard without executing the scanning operation for an AP.

Figure 6A:
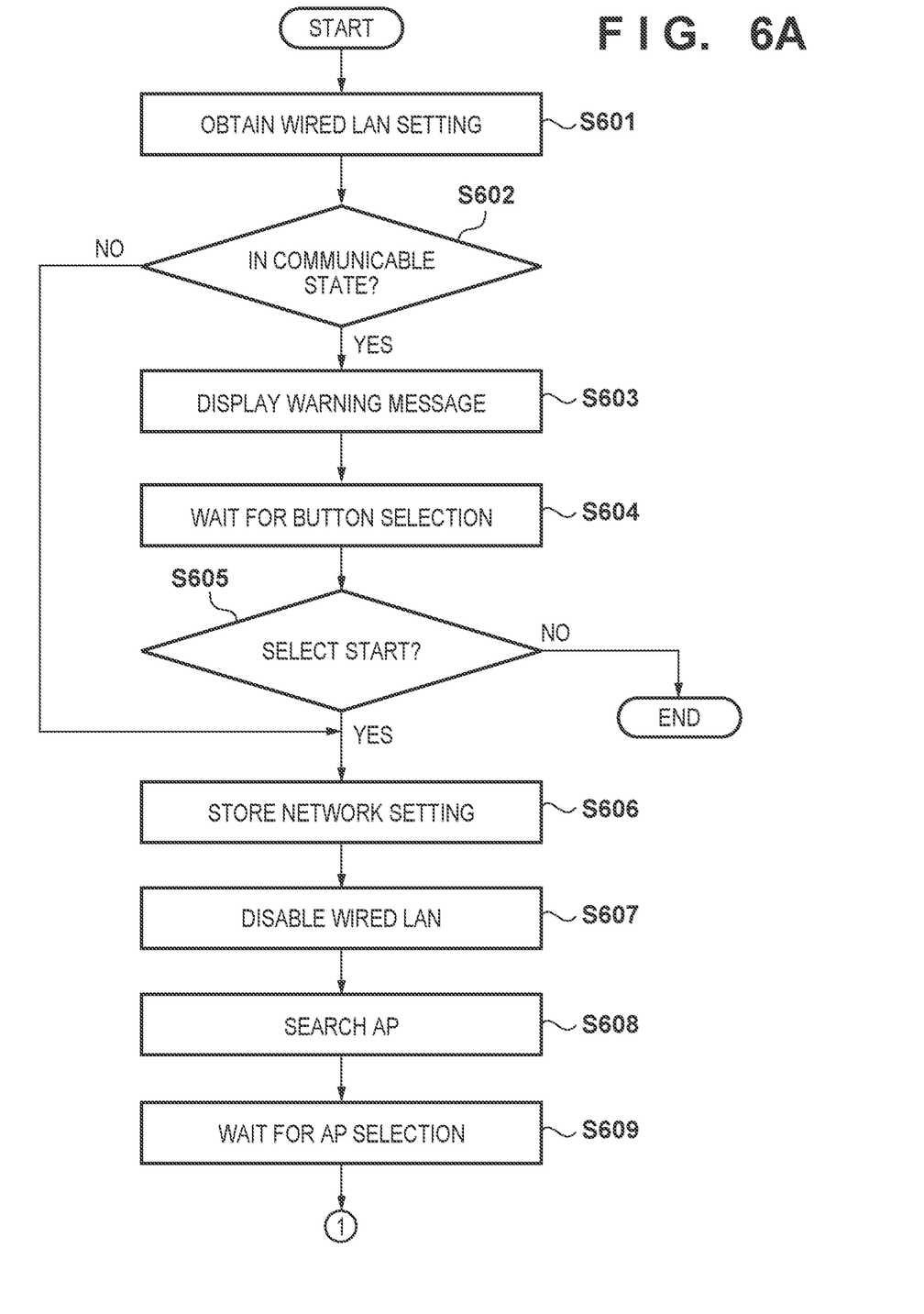
FIGS. 6A-6B shows a flowchart of the operation of the MFP.
Figure 6B:
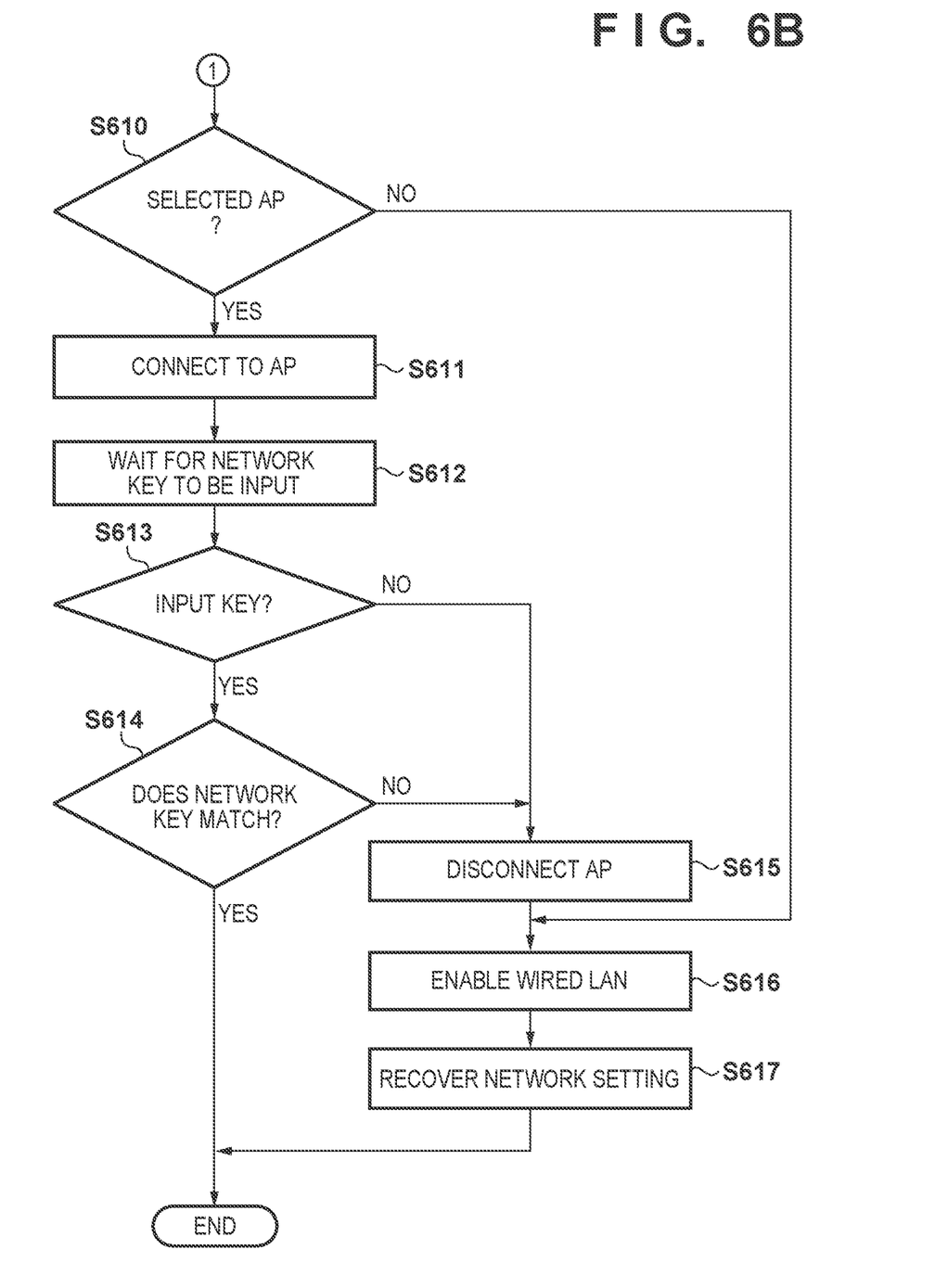

The operation of the MFP 100 according to this embodiment will be described next with reference to the flowchart of FIGS. 6A-6B. The processing of this flowchart is implemented by the CPU 202 reading out a program stored in a storage unit such as the RAM 203 or the like and executing the program. FIGS. 6A-6B shows, in particular, the procedure of processing performed when the wireless setup wizard is executed. The MFP 100 will execute the processing upon accepting, via the operation unit 101, a user operation to start the wireless setup wizard.

The MFP 100 obtains (step S601), from the user operation, the setting information of the wired LAN I/F to which the wireless setup wizard start instruction has been accepted, and determines (step S602) whether the wired LAN I/F is in a communicable state. In step S601, the setting information related to the wired LAN can be read out from the setting item list 400 shown in FIG. 4. Here, a communicable state represents a state in which the wired LAN communication has been enabled and an effective IP address has been set. An effective IP address may be a value other than 0.0.0.0. Alternatively, a predetermined reference for determining the effectiveness of the IP address may be set. The predetermined reference may be, for example, a setting to allow only a local address to be set as an effective IP address.

On the other hand, a non-communicable state represents a state in which the wired LAN communication has been disabled, a state in which an IP address has not been set even if the wired LAN communication has been enabled, or a state in which an ineffective IP address such as 0.0.0.0 or the like has been set even if the wired LAN communication has been enabled.

If it is determined that the wired LAN I/F is in a communicable state, the MFP 100 will display, on the operation panel 207, the wireless setup wizard start confirmation screen 500 (step S603). Since the wireless LAN state description message 501 is included in the wireless setup wizard start confirmation screen 500, the wireless LAN state description message 501 will also be displayed in step S603. On the other hand, if it is determined in step S602 that the wired LAN I/F is in a non-communicable state, that is, in a state in which the wired communication has already been disabled, the MFP 100 will cause the process to branch to step S606 without displaying the wireless setup wizard start confirmation screen 500 and store the settings of the wired LAN communication which is being currently used (step S606).

If the wireless setup wizard start confirmation screen 500 is displayed, the MFP 100 will wait for the user to press (that is, touch) a button (step S604). When the user has operated the operation panel 207, the MFP 100 will determine the contents of the user operation (step S605).

If it is determined that the start button 503 has been pressed, the settings of the wired LAN communication that is being currently used will be stored (step S606). For example, in a case in which the setting item list 400 of FIG. 4 is set to be used by being copied from a nonvolatile storage medium such as the hard disk 205 or the like to the RAM 203, the setting item list 400 of the RAM 203 may be written back to the HDD 205.

If it is determined that the cancel button 504 has been pressed, that is, if an operation to cancel the setting operation has been performed, the MFP 100 will immediately cancel the wireless setup wizard. Note that depending on the MFP 100, a home key, a clear key, or the like may be included in the operation panel 207, and the MFP may have a function to make the screen transition to a screen other than the wireless setup wizard screen when such a key is operated. When the home key or the clear key is pressed in this kind of an MFP, the wireless setup wizard may be immediately canceled in a manner similar to when the cancel button is pressed. Alternatively, even in a case in which the home key or the clear key has been operated, it may be set so that the wireless setup wizard will maintain a button input wait state even if the screen has shifted to screen display corresponding to the operated key. In addition, a timer set with a predetermined time may be activated when the wireless setup wizard is to wait for a button operation, and the wireless setup wizard may be canceled if the timer has expired without a button operation.

If it is determined in step S602 that the wired LAN is not in a communicable state or if it is determined in step S605 that the start button 503 has been operated, the wired LAN communication will be disabled (step S607) following the process of step S606. Disabling includes setting a value indicating "disabled" to the wired LAN enable/disable setting of the setting item list 400. Together with this setting operation, a value indicating "enabled" may be set to the wireless LAN enable/disable setting. After the disabling of the wired LAN (together with the enabling of the wireless LAN), a scanning operation, that is, a search for an AP which is present within the range of reach of the wireless signal will be performed (step S608). Note that the wired LAN communication need not be disabled in an MFP that can execute an scanning operation for an AP while executing the wired LAN communication.

If APs are discovered within the search range of the scanning operation for an AP, the MFP 100 will execute processing to select an AP to be a communication partner among the discovered APs. The MFP 100 can generate a list of communication partner candidates including the detected APs that may serve as a communication partner, display the generated list on the operation panel 207, and wait for the user to select an AP (step S609). When the user has selected an AP from the communication partner candidate list (step S610), the MFP 100 will start connecting to the selected AP (step S611). The AP selection may be performed by, for example, selecting one AP from the AP list and operating an enter button displayed together with the list. Note that if not a single AP is discovered, the enter button may be, for example, grayed out and displayed in an inoperable state. If the enter button is operated without the selection of an AP even though selectable APs are included in the AP list, such an operation may be determined to be invalid and ignored.

If an AP is not selected, the wired LAN communication setting will be enabled (step S616), and the network setting stored in step S606 will be used to recover the wired LAN communication (step S617). The fact that an AP was not selected is determined based on, for example, the operation of the cancel button displayed together with the AP list. In step S616, the wireless LAN setting may also be disabled together with the enabling of the wired LAN. In addition, if the wired LAN communication is recovered in step S617, an image or a message indicating that the wired LAN has been enabled may be displayed on the operation panel 207 to notify the user.

Note that if the disabling of the wired LAN (step S607) is not executed in an MFP that can execute the scanning operation for an AP while executing the wired LAN communication, the enabling of the wired LAN communication (step S616) and the recovery of the wired LAN communication (step S617) will not be performed. In such a case, the wireless setup wizard can be immediately canceled.

Next, to execute an authentication operation necessary for establishing a connection to the selected AP, the MFP 100 will display a screen for inputting a network key and wait for the user to input the network key (step S612). If the network key is input, whether the network key input by the user matches the network key received from the AP will be determined (step S614). The network key input can be performed by the user inputting a network key in a input field and operating an enter button which is displayed together with the input field. If the enter button is operated without an input of a network key, this operation can be determined to be invalid and ignored.

Note that if an AP has been selected, the SSID of this AP may be searched from the setting item list 400 to use a registered network key. In such a case, if a corresponding SSID is present in the setting item list 400, the processes of steps S612 and S613 can be skipped, and the process of step S614 can be executed by using, as the input network key, this corresponding network key linked to the SSID of the selected AP. If a corresponding SSID is not discovered or if communication cannot be established by using the network key obtained from the setting item list 400, the MFP can wait for a network key to be input.

If a network key is not input, the MFP 100 can disconnect the connection with the AP (step S615), enable the wired LAN communication setting (step S616), and recover the wired LAN communication by using the network setting stored in step S606 (step S617). The fact that a network key has not been input will be determined based on, for example, the operation of the cancel button displayed together with the network key input field. Note that since the connection between the MFP 100 and the AP has not been established at the stage of step S615, the AP search operation may simply be canceled in the process of step S615. The wireless LAN may also be disabled together with this process.

Note that if the disabling of the wired LAN (step S607) has not been performed, the enabling of the wired LAN communication (step S616) and the recovery of the wired LAN communication (step S617) need not be executed.

If it is determined in step S614 that the network key matches, the connection establishment processing will be directly ended, and the input network key will be used to execute communication using the wireless LAN I/F 211 with the connected AP. At this time, if the SSID of the selected AP is not stored in the setting item list 400, the SSID of the selected AP and the network key may be associated and stored in the setting item list 400. In addition, if the network key has been changed, the setting item list 400 may be updated by the changed network key. In a case in which the disabling of the wired LAN (step S607) has not been executed, the wired LAN communication may be disabled.

If it is determined in step S614 that the network key does not match, the MFP 100 will disconnect the connection with the AP (step S615), enable the wired LAN communication setting (step S616), and use the network setting stored in step S606 to recover the wired LAN communication (step S617).

Note that if the disabling of the wired LAN (step S607) has not been performed, the enabling of the wired LAN communication (step S616) and the recovery of the wired LAN communication (step S617) need not be executed.

Here, if it is determined in step S614 that the network key does not match, the connection by the wireless LAN is immediately abandoned and the connection by the wired LAN is recovered. Alternatively, in a case in which the network key has been determined not to match, the user may be asked to input the network key again. In such a case, the process may branch to the process of step S615 if the user gives up on inputting the network key and touches the cancel button displayed together with the network key input field. The number of times the network key can be input again may also be restricted, and the process may branch to the process of step S615 when the maximum number has been reached.

According to the above-described arrangement and procedure, in a case in which the wired LAN connection is to be disabled by executing the wireless setup wizard, the user who has executed the wireless setup wizard will be notified. Hence, the user who is executing the wireless setup wizard will be able to recognize that there may be an effect on other users use of the MFP 100 via the wired LAN.

In addition, even if the user has suspended the wireless setup wizard, a reconnection operation to the wired LAN can be automatically executed. As a result, it will be possible to prevent a state in which the connection is not reset to the wired LAN and suppress, to a minimum, the effect on other users using the wired LAN.

Note that the wireless setup wizard start confirmation screen 500 may be displayed even in a case in which a non-communicable state is determined in step S602. In such a case, however, the wireless setup wizard start confirmation screen will be displayed without including the wireless LAN state description message 501.

In addition, although the above embodiment described an arrangement using the wireless LAN for wireless communication and the wired LAN for wired communication, the communication method is not limited to the LAN, and another communication method may be employed.

In addition, in a case in which a user operation to enable a direct wireless communication function for causing the MFP to function as a software access point is received, control may be performed to start the execution of the direct wireless communication function without executing the above-described control operation. This is because the direct wireless communication function will rarely come into conflict with wired communication.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-116645, filed Jul. 6, 2020, which is hereby incorporated by reference herein in its entirety.

What is claimed is:

1. An information processing apparatus comprising:
a first communication interface configured to perform wireless communication via an external access point; and
a second communication interface configured to perform wired communication;
a display unit;
at least one memory that stores a set of instructions; and
at least one processor that executes the instructions, the instructions, when executed, causing the information processing apparatus to perform operations comprising:
enabling a first communication function for connecting to the external access point via the first communication interface and disabling a second communication function for performing wired communication via the second communication interface based on a reception at the display unit of a user operation for enabling the first communication function,
based on a user operation at the display unit for cancelling a setting of the first communication function being received before the information processing apparatus connects to the external access point via the first communication interface, enabling the second communication function which had been disabled based on the reception of the user operation for enabling the first communication function,
wherein the user operation for cancelling the setting of the first communication function is accepted in a state in which a screen for performing the setting operation is displayed on the display unit,
wherein the screen for performing the setting operation includes at least a first screen configured to receive an operation for selecting an access point and a second screen which is displayed after receiving the operation for selecting on the first screen and configured to allow a network key corresponding to the selected access point to be input.

2. The apparatus according to claim 1, wherein
in a case where the second communication function has not been disabled in a case in which the user operation for setting the first communication function has been received, the second communication function is disabled, and in a case where the user operation for cancelling the setting of the first communication function before the information processing apparatus connects to the external access point via the first communication interface has been received in a case where the second communication function has been disabled based on receiving, as a trigger, the user operation for setting the first communication function, the second communication function is enabled.

3. The apparatus according to claim 2, wherein the operations further comprise:

performing a predetermined notification operation to a user in a case where the second communication function has been enabled based on receiving, as a trigger, the user operation for cancelling the setting of the first communication function.

4. The apparatus according to claim 2, the operations further comprise notifying, in a case in which as user operation for using the first communication function has been received, a user of information indicating that the second communication function will not be able to be used.

5. The apparatus according to claim 4, wherein the operations further comprise:

setting, in a case in which the user operation for cancelling the setting operation has been received-in a state in which the user has been notified of the information, enabling the wired communication that had been disabled.

6. The apparatus according to claim 1, wherein the second communication interface is a communication interface configured to communicate with an external network by using an Ethernet® cable.

7. The apparatus according to claim 1, wherein the operations further comprise:

enabling, in accordance with receiving a predetermined user operation, a direct wireless communication function configured to cause the information processing apparatus to function as an access point that communicates with an external apparatus without intervention of the external access point, wherein a setting that will not use the second communication function is not disabled even when the direct wireless communication function is enabled.

8. The apparatus according to claim 1, wherein the information processing apparatus is a printer.

9. The apparatus according to claim 1, wherein, before disabling the second communication, a setting regarding the second communication is saved according to that a user operation for setting the first communication function has been accepted, and before the information processing apparatus connects to the external access point via the first communication interface, the second communication is disabled based on the saved setting regarding the second communication according to that the user operation for cancelling the setting of the first communication function has been accepted.

10. The apparatus according to claim 1, wherein the user operation for cancelling the setting of the first communication function is accepted when an operation unit is operated to cancel the setting of the first communication function without an operation for selecting the external access point discovered by the first communication function.

11. The apparatus according to claim 1, wherein the setting of the first communication function is a setting for connecting to the external access point by the first communication function.

* * * * *